United States Patent [19]

Ohmae et al.

[11] Patent Number: 4,840,847

[45] Date of Patent: Jun. 20, 1989

[54] CONJUGATE FIBERS AND NONWOVEN MOLDING THEREOF

[75] Inventors: Tadayuki Ohmae; Tadashi Sakurai; Kouichiro Asao, all of Chiba, Japan

[73] Assignee: Sumitomo Chemical Company, Limited, Osaka, Japan

[21] Appl. No.: 189,439

[22] Filed: May 2, 1988

[30] Foreign Application Priority Data

Feb. 4, 1988 [JP] Japan .................................. 63-25466

[51] Int. Cl.$^4$ .............................................. D02G 3/00
[52] U.S. Cl. .................................... 428/373; 428/296; 428/374
[58] Field of Search ............... 428/373, 374, 370, 397; 525/218; 526/307

[56] References Cited

U.S. PATENT DOCUMENTS

| | | | |
|---|---|---|---|
| 3,395,198 | 7/1968 | Taniguchi | 526/312 |
| 3,439,066 | 4/1969 | Coover | 525/218 |
| 4,211,819 | 7/1980 | Kunimune | 428/374 |
| 4,234,655 | 11/1980 | Kunimune | 428/359 |
| 4,269,888 | 5/1981 | Ejima | 428/369 |
| 4,315,881 | 2/1982 | Nakajima | 428/374 |
| 4,732,809 | 3/1988 | Harris | 428/374 |
| 4,764,551 | 8/1988 | Ohmae | 525/218 |
| 4,774,124 | 9/1988 | Shimalla | 428/288 |

Primary Examiner—Marion C. McCamish
Assistant Examiner—Jill Gray
Attorney, Agent, or Firm—Sughrue, Mion, Zinn, Macpeak & Seas

[57] ABSTRACT

A conjugate fiber obtained by melt spinning (A) a crystalline poly-α-olefin and (B) an ethylene copolymer containing from 40 to 95% by weight of an ethylene unit and from 5 to 60% by weight of at least one dialkylaminoalkylacrylamide comonomer unit represented by formula (I):

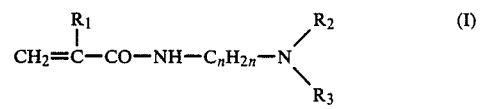

wherein $R_1$ represents a hydrogen atom or a methyl group; $R_2$ and $R_3$ each represents an alkyl group having from 1 to 4 carbon atoms; and n represents an integer of from 2 to 5, said ethylene copolymer having a melt index of from 10 to 1000 g/10 min as measured according to JIS K-6760, either by aligning the components (A) and (B) in parallel or by aligning the component (A) as a core and the component (B) as a sheath. The conjugated fiber is excellent in thermal adhesion, absorptivity by an acid aqueous solution, and dyeability and can easily be fabricated into a nonwoven fabric or nonwoven molding suited for various applications including separators of lead accumulators.

3 Claims, No Drawings

CONJUGATE FIBERS AND NONWOVEN MOLDING THEREOF

FIELD OF THE INVENTION

This invention relates to a conjugate fiber composed of a crystalline poly-α-olefin and a copolymer of ethylene and a dialkylaminoalkylacrylamide comonomer. More particularly, it relates to a conjugate fiber which is excellent in not only thermal adhesion but absorptivity for an acid aqueous solution and also satisfactory in dyeability and to a nonwoven molding obtained therefrom.

The conjugate fiber according to the present invention is a highly promising material for functional nonwoven fabric or molding suited for various uses such as separators of lead accumulators, acid absorbent materials, simplified clothes, and the like.

BACKGROUND OF THE INVENTION

Conjugate fibers composed of a crystalline poly-α-olefin, e.g., crystalline polypropylene, as a first component and a resin having a melting point lower than that of the first component as a second component, which can be fabricated easily into nonwoven fabrics by thermal adhesion at low temperatures, have been proposed, e.g., in Japanese Patent Publication Nos. 37097/77, 44773/79, 44774/79, 483/80 17807/80, 26203/80, and 26209/80. The low-temperature thermal adhesive resin as the second component in these conventional conjugate fibers include polyethylene, a copolymer of ethylene and vinyl acetate or a saponification product thereof, and the like.

Nonwoven fabrics obtained from these conjugate fibers have been chiefly utilized for the purpose of retaining water or other solutions in their voids, and the second component resin used is primarily intended for a drop in temperature for the thermal adhesion.

On the other hand, separators of sealed type lead accumulators, to which the nonwoven fabric made from the conjugate fibers of the present invention is chiefly applicable, have been prepared from a glass mat comprising fine glass fibers or nonwoven fabrics made of a single component, e.g., polyethylene, polypropylene, etc.

However, an ordinary glass mat undergoes shrinkage during use to lose intimate contact with grids, resulting in deterioration of performance as an accumulator. In addition, since the shrinked glass mat does not serve to retain an electrolyte liquor any more, the solution is released therefrom and descends therethrough, which leads to a reduction in discharge capacity. Therefore, it has been required to use an expensive mat composed of superfine glass fibers having fine voids.

Further, nonwoven fabrics comprising polyethylene, polypropylene, etc. are inferior in wettability by an electrolyte liquor due to their water repellency and, therefore, have poor retention of an electrolyte liquor. As a result, the electrolyte liquor is released therefrom and descends therethrough during use.

SUMMARY OF THE INVENTION

An object of this invention is to provide a conjugate fiber nonwoven fabric which exhibits satisfactory retention of an acid aqueous solution and is useful as a separator of lead accumulators, being freed from the above-described disadvantages associated with the conventional glass fiber mat or nonwoven fabric made from polyethylene, polypropylene, etc.

As a result of extensive investigations, it has now been found that a conjugate fiber composed of a crystalline poly-α-olefin as a first component and a copolymer of ethylene and an aminoalkylacrylamide comonomer as a second component is excellent in not only retention of an acid aqueous solution but also dyeability and is promising as a material for functional nonwoven fabrics, nonwoven moldings, nonwoven filters, and the like that are suited for use as separators of lead accumulators as well as water purifying cloth, simplified clothes, etc.

That is, the present invention relates to a conjugate fiber obtained by melt spinning (A) a crystalline poly-α-olefin and (B) an ethylene copolymer containing from 40 to 95% by weight of an ethylene unit and from 5 to 60% by weight of at least one dialkylaminoalkylacrylamide comonomer unit represented by formula (I):

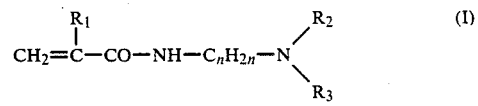

wherein $R_1$ represents a hydrogen atom or a methyl group; $R_2$ and $R_3$ each represents an alkyl group having from 1 to 4 carbon atoms; and n represents an integer of from 2 to 5, said ethylene copolymer having a melt index (JIS K-6760) of from 10 to 1000 g/10 min, either by aligning the components (A) and (B) in parallel or by aligning the component (A) as a core and the component (B) as a sheath.

The present invention further relates to a nonwoven molding obtained by thermally adhering the aforesaid conjugate fiber at a temperature no lower than the melting point of the component (B) and no higher than the melting point of the component (A).

The feature of the conjugate fiber according to this invention lies in that it can easily be fabricated into a nonwoven molding taking advantage of thermal adhesion of the ethylene copolymer and that it is applicable to various uses, such as separators of lead accumulators, water purifying cloth, etc., making best use of the characteristics of the second component (B), i.e., absorptivity by various acid aqueous solutions, and conductivity of the acid aqueous solutions. Moreover, the conjugate fiber is also excellent in dyeability with acid dyes, etc. and, therefore, can be utilized as a material for clothes, wall coverings, carpet piles, etc.

DETAILED DESCRIPTION OF THE INVENTION

The ethylene copolymer which can be used as the second component (B) in the conjugate fiber of the invention comprises from 40 to 95% by weight, and preferably from 50 to 80% by weight, of an ethylene unit and from 5 to 60% by weight, and preferably from 20 to 50% by weight, of a a dialkylaminoalkylacrylamide comonomer unit represented by formula (I). The ethylene copolymer can generally be prepared by radical polymerization of ethylene and the comonomer of formula (I) at a high temperature under a high pressure.

If the comonomer unit content in the ethylene copolymer is less than 5% by weight, that is, the ethylene unit content is more than 95% by weight, the copolymer resin does not show to the full its characteristics, such as absorptivity by an acid aqueous solution. If the comonomer unit content is more than 60% by weight, that is, the ethylene unit content is less than 40% by weight, the ethylene copolymer becomes so hydrophilic that the mechanical strength is reduced upon absorption of an acid aqueous solution, failing to retain the properties as fiber. There are further problems, such as difficulty in spinning and increase in cost.

From the standpoint of spinnability into conjugate fibers, the ethylene copolymer should have a melt index (in accordance with JIS K-6760) of from 10 to 1000 g/10 min, and preferably from 30 to 500 g/10 min.

The ethylene copolymer according to the present invention can be prepared by high-pressure radical polymerization as described, e.g., in Japanese Patent Publication Nos. 22523/67 and 6194/78. In some detail, ethylene and the dialkylaminoalkylacrylamide comonomer of formula (I) are continuously fed to a stirring type reaction vessel or a tubular reactor together with oxygen and a free radical initiator, such as organic peroxides and diazo compounds, and polymerized at a temperature of from 100° to 300° C. under a pressure of from 500 to 3,000 kg/cm$^2$. Various chain transfer agents, e.g., ethane, propane, propylene, etc., may be used for molecular weight control.

Specific and preferred examples of the dialkylaminoethylacrylamide comonomers include dimethylaminoethylacrylamide, dimethylaminopropylacrylamide, dimethylaminobutylacrylamide, diethylaminoethylacrylamide, diethylaminopropylacrylamide, diethylaminobutylacrylamide, di-n-propylaminoethylacrylamide, di-n-propylaminopropylacrylamide, N-(1,1-dimethyl-3-dimethylaminopropyl)acrylamide, N-(2-methyl-3-dimethylaminopropyl)acrylamide, etc., and methacrylamide derivatives corresponding to these acrylamide derivatives. These comonomers can be used either individually or in combinations of two or more thereof.

Of the above-enumerated comonomers, more preferred are dimethylaminopropylacrylamide, dimethylaminopropylmethacrylamide, dimethylaminoethylacrylamide, and dimethylaminoethylmethacrylamide.

If desired, the ethylene copolymer to be used in the present invention may further comprise one or more of other ethylenically unsaturated comonomers which are copolymerizable with ethylene. Preferred examples of the copolymerizable ethylenically unsaturated comonomers are dialkylaminoalkyl acrylates, e.g., dimethylaminoethyl acrylate, dimethylaminoethyl methacrylate, etc., and unsaturated esters, e.g., methyl acrylate, methyl methacrylate, ethyl acrylate, ethyl methacrylate, n-butyl acrylate, n-butyl methacrylate, glycidyl acrylate, glycidyl methacrylate, vinyl acetate, vinyl propionate, etc. Preferred of them are dimethylaminoethyl methacrylate, dimethylaminoethyl acrylate, methyl acrylate, methyl methacrylate, ethyl acrylate, and vinyl acetate.

The content of the above-described ethylenically unsaturated comononer unit in the ethylene copolymer should not exceed 20% by weight, and preferably not exceed 15% by weight.

The above-described ethylene copolymer can be used as the component (B) either individually or in combination thereof.

The crystalline poly-α-olefin which can be used as the component (A) includes crystalline homopolymers of α-olefins, e.g., polyethylene, polypropylene, polybutene-1, poly-4-methylpentene-1, etc. and, in addition, various crystalline copolymers, e.g., an ethylene-propylene copolymer, a butene-1-propylene copolymer, a butene-1-ethylene copolymer, etc.; copolymers of ethylene and unsaturated ester comonomers, e.g., an ethylene-vinyl acetate copolymer, an ethylene-methyl methacrylate copolymer, an ethylene-ethyl acrylate copolymer, etc.; and a saponification product of an ethylene-vinyl acetate copolymer. Of these, crystalline propylene homo- or copolymers having a melt index (JIS K-6758, 230° C.) of from 2 to 100 g/10 min are of industrial significance.

The conjugate fiber of the present invention can be obtained by the use of ordinary parallel type or core sheath type conjugate spinning machines, such as those described in *Kagaku Zokan*, Vol. 50 "Seni no keisei to kozo no hatsugen (III)", Kagaku Dojinsha (1971).

In order to assure fiber strength and to fully display the characteristics of the second component (B), a mixing ratio of the components (A) and (B) ranges from 20:80 to 80:20, and preferably from 40:60 to 60:40, by weight. The cross-section of the conjugate fiber is not limited to a round shape and may be an irregular shape, such as an ellipsoidal shape.

The form of conjugate fiber preferably includes a parallel form and a core-sheath form. Multi-island type conjugate fibers and multi layer type conjugate fibers can also be used.

In the case where the conjugate fiber of the present invention is stretched for the purpose of ensuring strength or the like, it is usually suitable to stretch the fiber 2 to 6 times under such a temperature condition that does not cause fusion of the fibers among themselves, namely, above the point lower than the softening point of the ethylene copolymer by 10° C.

The conjugate fibers may be used as prepared in the form of continuous filament fibers. In a preferred embodiment of the present invention, the conjugate fibers can be fabricated into nonwoven fabrics to accommodate various uses by, for example, cutting into staples of an appropriate length, forming the staples into a web in a usual manner as described, e.g., in *Shinkobunshi bunko*, Vol. 5, "Fushokufu yoron", Kobunshi Gakkai (1973), and then heating the web at a temperature no lower than the melting point of the component (B) and no higher than the melting point of the component (A). The fibers can also be fabricated into nonwoven moldings, such as pipes, rods, grids, etc. If desired in view of hand and feel, the fibers may be subjected to crimping either before or after cutting into staples.

In the case where the nonwoven fabric made of the conjugate fiber of the present invention is applied to a separator of lead accumulators, the nonwoven fabric is inserted between ordinary paste type anode and cathode grids which are produced by applying a paste of an active material powder (e.g., lead oxide) in sulfuric acid onto a lead alloy grid, drying the applied paste, and subjecting the active material to formation. Thereafter, sulfuric acid having a specific gravity of from 1.2 to 1.4 is absorbed and retained in the nonwoven fabric, and initial charge is carried out to complete a lead accumulator.

The nonwoven fabric according to the present invention exhibits satisfactory absorptivity by an electrolyte liquor of a lead accumulator. For example, the fibers constituting the nonwoven fabric can absorb sulfuric acid having a specific gravity of 1.4 in an amount of from 2 to 4 times the weight of its own at room temperature while retaining from 5 to 15 times the weight of the sulfuric acid in their voids. Upon absorption of an electrolyte liquor, the nonwoven fabric is swollen to press the grids so that the contact electrical resistance on the surfaces of the grids is minimized. Further, since the ethylene copolymer, the component (B), has good wettability by the sulfuric acid electrolyte liquor, the resulting lead accumulator can maintain its performance during long-term use without involving elimination of the electrolyte liquor from the nonwoven fabric separator.

Furthermore, the ethylene copolymer resin can be dyed with acid dyes and the like. Therefore, the conjugate fibers of the present invention can be dyed for use as clothes, carpets, wall coverings, etc.

If desired, the components (A) and/or (B) may contain various additives, such as stabilizers, fillers, etc.

The present invention is now illustrated in greater detail with reference to the following Examples and Reference Example, but it should be understood that the present invention is not deemed to be limited thereto. In these examples, all the percents, parts, and ratios are by weight unless otherwise indicated.

thickness, and density of the resulting nonwoven fabric are shown in Table 1.

TABLE

| Example No. | Conjugate Form | Component (A) (Amount: part) | Component (B) (Amount: part) | Nonwoven Fabric | | |
|---|---|---|---|---|---|---|
| | | | | Basis Weight ($g/m^2$) | Thickness (mm) | Density ($g/m^3$) |
| 1 | parallel | P-1 (50) | E-1 (50) | 400 | 3.3 | 0.12 |
| 2 | " | "(50) | E-2 (50) | 400 | 3.1 | 0.13 |
| 3 | " | "(40) | E-3 (60) | 550 | 5.0 | 0.11 |
| 4 | " | "(60) | E-4 (40) | 800 | 3.2 | 0.25 |
| 5 | " | "(50) | E-5 (50) | 200 | 2.4 | 0.08 |
| 6 | " | P-2 (50) | E-2 (50) | 400 | 2.0 | 0.20 |
| 7 | core-sheath | P-1 (50) | E-2 (50) | 400 | 3.3 | 0.12 |

Note:
P-1: "Sumitomo Noblen ® FL800", a trade name of crystalline polypropylene of homopolymer grade produced by Sumitomo Chemical Co., Ltd.; melt index (MI) = 10 g/10 min (according to JIS K-6758)
P-2: "Sumitomo Noblen ® WF727R", a trade name of a crystalline propylene-ethylene random copolymer grade produced by Sumitomo Chemical Co., Ltd.; ethylene content: 4%; MI = 30 g/10 min
E-1: A 50/50 copolymer of ethylene and dimethylamino-propylacryamide; MI = 55 g/10 min (according to JIS K-6760)
E-2: A 59/41 copolymer of ethylene and dimethylamino-propylacryamide; MI = 300 g/10 min
E-3: A 72/28 copolymer of ethylene and dimethylamino-propylacryamide; MI = 30 g/10 min
E-4: A 61/39 copolymer of ethylene and dimethylamino-propylacryamide; MI = 270 g/10 min
E-5: A 61/25/14 copolymer of ethylene, dimethylamino-propylacrylamide, and dimethylaminoethyl methacrylate; MI = 220 g/10 min

EXAMPLES 1 to 7

A crystalline propylene homo- or copolymer shown in Table 1 [component (A)] and a copolymer of ethylene and a dialkylaminoalkylacrylamide [component (B)] shown in Table 1 were melt-spun by means of a conjugate spinning machine composed of two extruders having a diameter of 25 mm (L/D=15) equipped with a parallel type or core-sheath type die having 12 nozzles of 0.8 mm in diameter under conditions of a nozzle temperature of 260° C., resin temperatures of 260° C. for the component (A) and 190° C. for the component (B), a rate of extrusion of 1 kg/hr, and a take-up speed of 240 m/min. Then, the filament was run on a hot grid whose surface was set at 95° C. to stretch 2.5 times. There was obtained a parallel type or core-sheath type conjugate fiber having a diameter of 55 μm.

The spinning could be conducted without breaks of fibers in each case.

Each of the resulting conjugate fibers was cut into staple fibers having a length of 60 mm. Nine grams of the staple fibers were uniformly spread over an area of 15 cm × 15 cm to form a web having a weight of 200 to 850 $g/m^2$. The web was kept in a hot air dryer at 130° C. for 5 minutes under a uniform load of 3 to 8 $g/cm^2$ to thereby thermally fuse the component (B) to obtain a homogeneous nonwoven fabric. The basis weight,

EXAMPLE 8

A Teflon ® pipe having an outer diameter of 25 mm, an inner diameter of 15 mm, and a length of 100 mm was concentrically inserted into a Teflon ® pipe having an outer diameter of 60 mm, an inner diameter of 40 mm, and a length of 100 mm, and 17 g of the staple fibers prepared in Example 2 (fiber length: ca. 60 mm) were uniformly packed in the space between the two pipes. The staples packed were kept in a hot air dryer at 130° C. for 10 minutes to thereby thermally adhere the component (B).

The outer and inner Teflon ® pipes were removed to obtain a nonwoven pipe having a size of 40 mm in outer diameter, 25 mm in inner diameter, and 100 mm in length and having a porosity of 76% and a density of 0.22 $g/cm^3$.

REFERENCE EXAMPLE

Two sheets each measuring 5.5 cm × 4.5 cm and weighing 1 g were cut out of the nonwoven fabric prepared in Example 2. One anode grid and two cathode grids of 5.5 cm × 4.5 cm were removed from a lead accumulator for very convenient use ("6N2-2A-8" manufactured by Yuasa Battery Co., Ltd). The anode grid was sandwiched between the two cut pieces of the nonwoven fabric, and the cathode grid was superposed on the both sides thereof. The resulting grid unit was inserted in a polypropylene battery case having an inside dimension of 6 cm in length, 1.3 cm in width, and 6 cm in height.

Thirty grams of 40% sulfuric acid was poured into the case. In 2 hours, the sulfuric acid was found to be in a non-fluid state, having been absorbed in the nonwoven fabric, the anode grid, and the cathode grids and, at the same time, held in voids of the nonwoven fabric.

A battery top was mounted on the case, and initial charge was carried out to complete a lead accumulator.

As described above, the present invention provides a conjugate fiber and a nonwoven molding thereof which is excellent in retention of an acid aqueous solution as well as dyeability.

While the invention has been described in detail and with reference to specific embodiments thereof, it will be apparent to one skilled in the art that various changes and modifications can be made therein without departing from the spirit and scope thereof.

What is claimed is:

1. A conjugate fiber obtained by melt spinning (A) a crystalline poly-α-olefin and (B) an ethylene copolymer containing from 40 to 95% by weight of an ethylene unit and from 5 to 60% by weight of at least one dialkylaminoalkylacrylamide comonomer unit represented by formula (I):

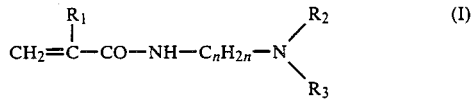

wherein $R_1$ represents a hydrogen atom or a methyl group; $R_2$ and $R_3$ each represents an alkyl group having from 1 to 4 carbon atoms; and n represents an integer of from 2 to 5, said ethylene copolymer having a melt index of from 10 to 1000 g/10 min as measured according to JIS K-6760, either by aligning the components (A) and (B) in parallel or by aligning the component (A) as a core and the component (B) as a sheath.

2. A conjugate fiber as claimed in claim 1, wherein said dialkylaminoalkylacrylamide derivative is selected from the group consisting of dimethylaminopropylacrylamide, dimethylaminopropylmethacrylamide, dimethylaminoethylacrylamide, and dimethylaminoethylmethacrylamide.

3. A conjugate fiber as claimed in claim 1, wherein said crystalline poly-α-olefin is crystalline polypropylene.

* * * * *